(12) United States Patent
Jain (10) Patent No.: US 8,321,409 B1
(45) Date of Patent: Nov. 27, 2012

(54) DOCUMENT RANKING USING WORD RELATIONSHIPS

(75) Inventor: Sharad Jain, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/174,224

(22) Filed: Jun. 30, 2011

Related U.S. Application Data

(63) Continuation of application No. 12/024,944, filed on Feb. 1, 2008, now Pat. No. 7,996,379.

(51) Int. Cl.
*G06F 17/30* (2006.01)
(52) U.S. Cl. ...................................... 707/723
(58) Field of Classification Search .................. 707/1, 5, 707/723; 709/223
See application file for complete search history.

(56) References Cited

U.S. PATENT DOCUMENTS

2002/0069190 A1* 6/2002 Geiselhart ..................... 707/1
2006/0218139 A1* 9/2006 Goto et al. ..................... 707/5

* cited by examiner

*Primary Examiner* — Etienne LeRoux
(74) *Attorney, Agent, or Firm* — Fish & Richardson P.C.

(57) ABSTRACT

Methods, systems, and apparatus, including computer program products, for scoring documents. A plurality of documents with an initial ordering is received. Local term relationships between terms in the plurality of documents are identified, each local term relationship being a relationship between a pair of terms in a respective document. Relationships among the documents in the plurality of documents are determined based on the local term relationships and on the initial order of the documents. A respective score is determined for each document in the plurality of documents based on the document relationships.

21 Claims, 8 Drawing Sheets

DOCUMENT RANKING USING WORD RELATIONSHIPS

RELATED APPLICATIONS

This U.S. patent application is a continuation of and claims priority under 35 U.S.C. §120 from U.S. patent application Ser. No. 12/024,944, filed on Feb. 1, 2008. The disclosure of this prior application is considered part of the disclosure of this application and is hereby incorporated herein by reference in its entirety.

BACKGROUND

The subject matter of this specification relates generally to search systems.

The World Wide Web (the "web") contains a vast amount of information. A user can use a search engine to find the information on the Web in which the user is interested. The user enters a search query into a search engine. The search engine matches the search query to an index of crawled web pages. The web pages in the index that satisfy the search query are returned to the user as hyperlinks. The web pages that satisfy the search query can be ranked by the search engine based on various factors, including, for example, the relevance of the web page to the search query.

SUMMARY

In general, one aspect of the subject matter described in this specification can be embodied in methods that include the actions of receiving a plurality of documents, where the plurality of documents has an initial order; identifying local term relationships between terms in the plurality of documents, each local term relationship being a relationship between a pair of terms in a respective document; determining relationships among the documents in the plurality of documents based on the local term relationships and on the initial order of the documents; and determining a respective score for each document in the plurality of documents based on the document relationships. Other embodiments of this aspect include corresponding systems, apparatus, computer program products, and computer readable media.

Particular embodiments of the subject matter described in this specification can be implemented so as to realize one or more of the following advantages. More diverse search results are presented for an ambiguous query. An order in which search results are presented can be re-arranged such that the topmost search results introduce a more diverse range of information. Relationships between documents that have no hyperlinks connecting them to each other can be determined. Terms related to a given term in a corpus of documents can be identified and presented as related terms that can be used as navigational references to documents in the corpus.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
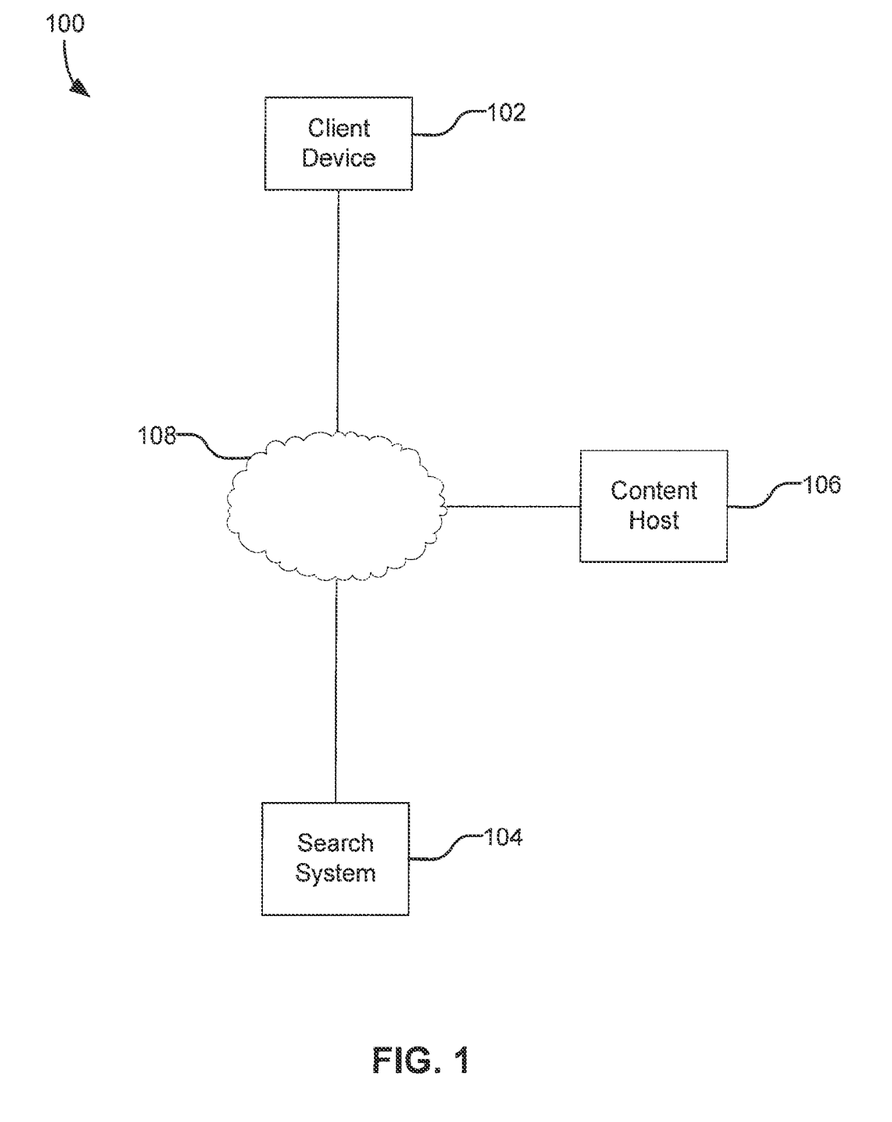
FIG. 1 is a block diagram illustrating an example search environment.

FIG. 1 illustrates an example search environment 100. The search environment 100 includes a client device 102, a search system 104, and one or more content hosts 106. The client device 102, search system 104, and content hosts 106 can communicate over one or more networks 108. Content hosts 106 can include servers that store and serve resources. Examples of networks 108 include local area networks (LANs), wide area networks (WANs), wireless (e.g., Wi-Fi) networks, mobile phone networks, and the Internet, for example.

The search system 104 indexes resources hosted by content hosts 106. The search system 104 crawls the content hosts 106 to identify resources available for indexing. In some implementations, the search system 104 also stores copies of the indexed resources. Examples of resources include documents (e.g., webpages, Portable Document Format (PDF) documents, text files, word processing documents, etc.), audio files, video files, images, and so on.

The search system 104 can receive search queries for resources (e.g., from a client device 102). For a respective search query, the search system 104 searches the index for indexed resources that satisfy the search query. A query includes one or more terms (e.g., words, phrases, characters, ideograms, numbers, etc.). In some implementations, the search system 104 generates search results, including scoring and ranking resources that satisfy the search query. The search results are transmitted from the search system 104 to a client device 102 for presentation to a user.

The client device 102 can be any device that can communicate with the search system 104 and the content hosts 106 through the one or more networks 110. In some implementations, the client device 102 includes a client application (e.g., a web browser) that can access the search system 104 and/or the content hosts 106. Examples of client devices 102 include desktop computers, notebook computers, tablet computers, personal digital assistants (PDAs), mobile phones, smartphones, media players, game consoles, portable gaming devices, set-top boxes, and so on.

Figure 2:
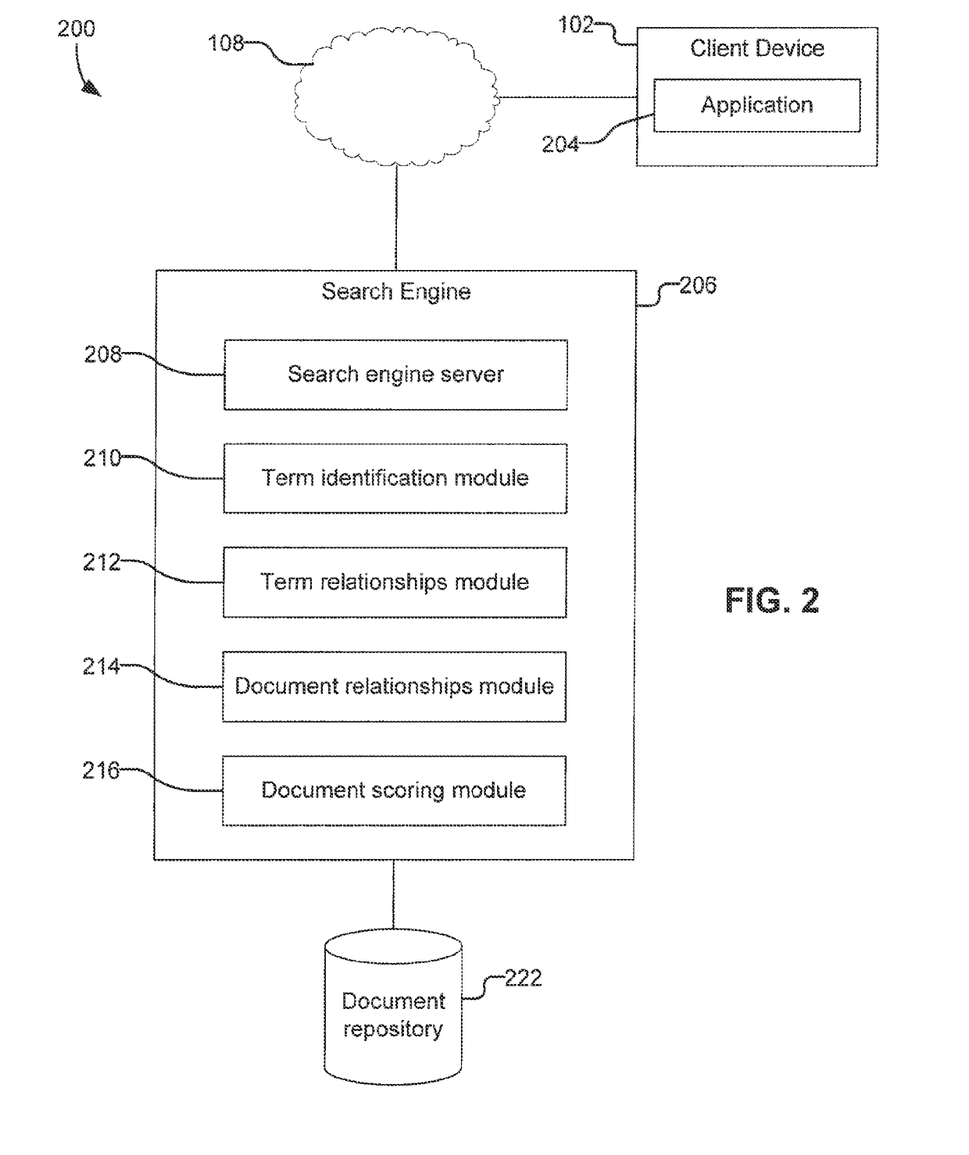
FIG. 2 is a block diagram illustrating an example system architecture for a search environment.

FIG. 2 illustrates an example system architecture 200 for a search environment. The system architecture 200 includes a search engine 206 and a client device 102. The search engine 206 and the client device 102 can communicate over one or more networks 108. In some implementations, search engine 206 is an implementation of search system 104.

In some implementations, the search engine 206 includes a search engine server 208, term identification module 210, term relationships module 212, document relationships module 214, and document scoring module 216. In some other implementations, the functionality of the search engine 206 can be organized in other ways. The system architecture 200 also includes a document repository 222.

The search engine server 208 receives queries from client devices 102, generates the responses to the queries (e.g., search results), and transmits the responses to the client devices 102. In some implementations, the search results include hyperlinks to documents. The search engine server 208 can also crawl documents, index the crawled documents, store documents in the document repository 222, and retrieve documents for further processing.

The term identification module 210 identifies terms in a document. The term identification module 210 parses textual content in a document and identifies terms in the textual content. A term can include one or more words, phrases, characters, ideograms, numbers, etc. A term can be a name for an entity (hereinafter referred as "named entity"). For example, names of people, places, organizations, and the like are terms that can be identified by the term identification module 210. In some implementations, a term in a document is an information nugget. An information nugget is a sequence of text that carries information (e.g., names, phrases, sentences, etc.). Examples of information nuggets are disclosed in U.S. patent application Ser. No. 11/378,628, titled "Detecting Novel Document Content," filed Mar. 20, 2006, which is incorporated by reference herein in its entirety.

In some implementations, the term identification module 210 also determines scores for the identified terms in a document based on one or more criteria (e.g., number of occurrences in the document, position of earliest occurrence in the document). The scores can be used by the term identification module 210 as a metric of the significance of the term in the document.

The term relationships module 212 identifies relationships (or "interactions") between terms within a document. Term relationships with the document (or "local term relationships") can be identified based on the proximity of terms to each other within the document. For example, terms that appear in the same paragraph can be said to have a relationship (or have an interaction). In some implementations, the term relationships module 212 can also generate graphs to represent the relationships and to determine weights or scores for the relationships.

The term relationships module 212 can also identify term relationships across a set of documents from the local term relationships of the documents in the set. In some implementations, the term relationships module 212 generates a global term graph to represent these relationships, further details of which are described below.

Document relationships module 214 determines document relationships for a set of documents. In some implementations, the document relationships are determined based on a global word graph for the set of documents. The document relationships module 214 can generate a graph representing the document relationships.

Document scoring module 216 determines scores for documents based on one or more criteria. In some implementations, the document scoring module 214 determines a score for each document in a set of documents by analyzing a graph of the document relationships in the set of the documents.

The document repository 222 can store an index of documents crawled by the search engine 206. The document repository 222 can also store other information (e.g., metadata) related to the documents. In some implementations, the document repository 222 can be implemented as a database. In some implementations, the document repository 222 also stores copies of one or more of the indexed documents.

The client device 102 can include an application 204. In some implementations, the application 204 is a web browser. A user can use the application 204 to access a user interface of the search engine server 208, to submit queries, and to receive search results.

Figure 3:
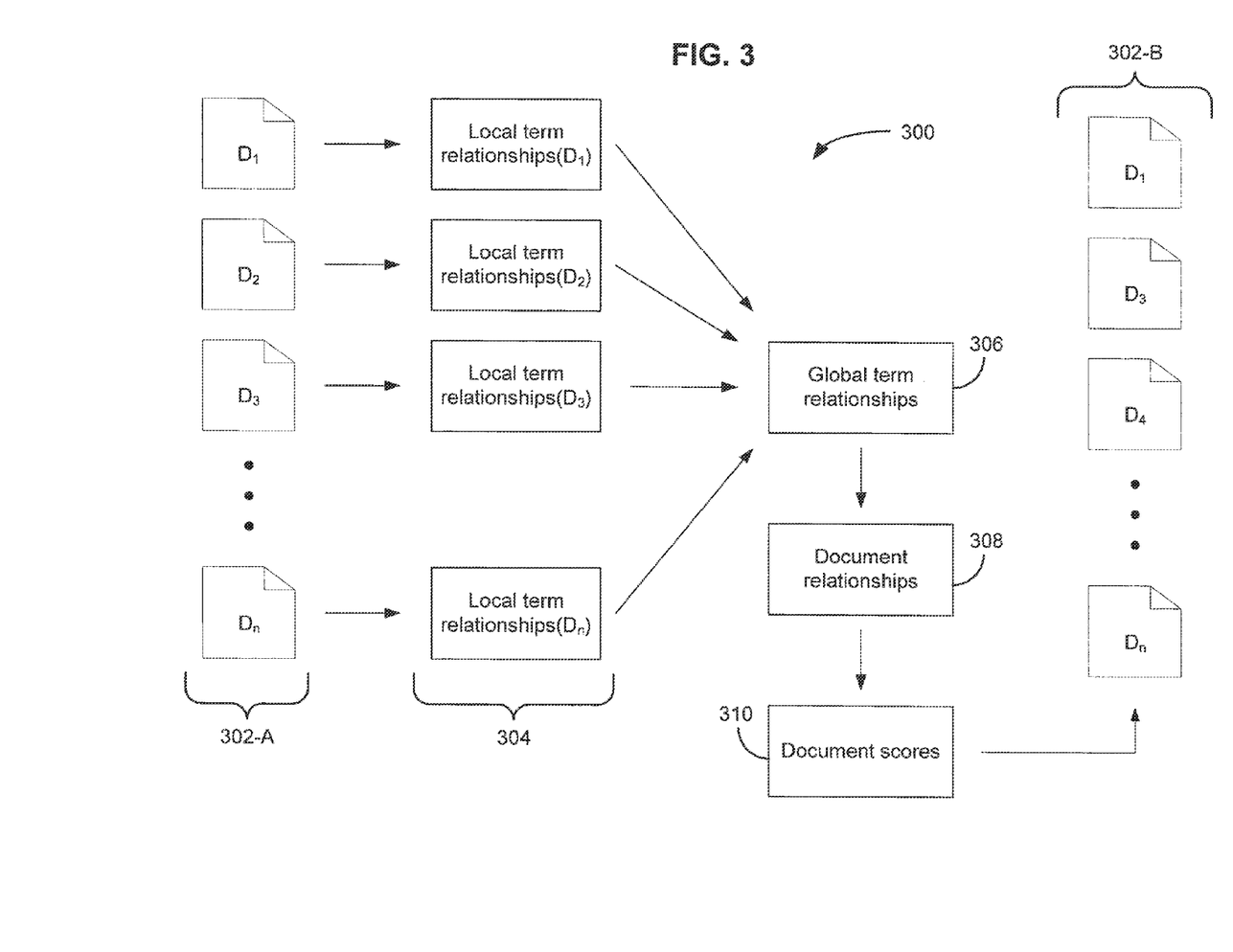
FIG. 3 is a diagram illustrating an implementation of a process for determining scores for documents using term relationships.

FIG. 3 is a diagram illustrating an implementation of a process 300 for determining scores for documents using term relationships. The input into the process 300 is a set of ordered documents 302-A. In some implementations, the documents 302-A are webpages and other documents that have been determined by a search system to satisfy a particular search query and which have been scored by the search system and ordered based on those scores. In some other implementations, the set of ordered documents are a plurality of documents that are ordered based on one or more criteria (e.g., date of creation, date of last modification, alphabetical order by title, alphabetical order by author, etc.).

Terms in the documents are identified and local term relationships 304 are identified for each one of the documents 302-A. In some implementations, an undirected local term relationship graph is generated for each of the documents 302-A. The local term relationship graph for a document represents the relationships between terms in the document and weights of the relationships, with terms being the nodes of the graph and the relationships being the edges of the graph. A weight or score is determined for each local term relationship. The weight of a local term relationship is the weight of the corresponding edge in the local term relationship graph.

Term relationships 306 for the set of documents 302-A as a group ("global term relationships") are identified from the local term relationships 304. In some implementations, the global term relationships are a subset of the local term relationships in the documents 302-A. In some implementations, the global term relationships 306 are represented by a global term relationship graph, where the weights of the edges are derived from the weights of the local term relationships.

Document relationships 308 for the set of documents 302-A are determined from the global term relationships 306. In some implementations, the document relationships are represented by a document relationships graph that is generated based on the global term relationships 306.

Scores 310 are determined for the documents based on the document relationships 308. In some implementations, the scores 310 are determined by a link analysis of a document relationships graph for the set of documents 302-A. In some implementations, the scores determined from the document relationships can be combined with another document score. For example, the score based on the document relationships can be combined with a document relevance score determined by the search engine to get an overall document score for a document.

The output of the process 300 is a set of ordered documents 302-B. Documents 302-B is the same set of documents as documents 302-A, ordered in an order that may be different than the ordering of the documents 302-A. In some implementations, the ordering of the documents 302-B is based on the document scores 310.

In implementations where documents 302 are web pages and other documents that satisfy a search query, search results corresponding to documents 302-B, where the results are ordered as the documents 302-B are ordered, can be transmitted to a client device 102 for presentation to a user who submitted the search query to the search engine 206.

Figure 4:
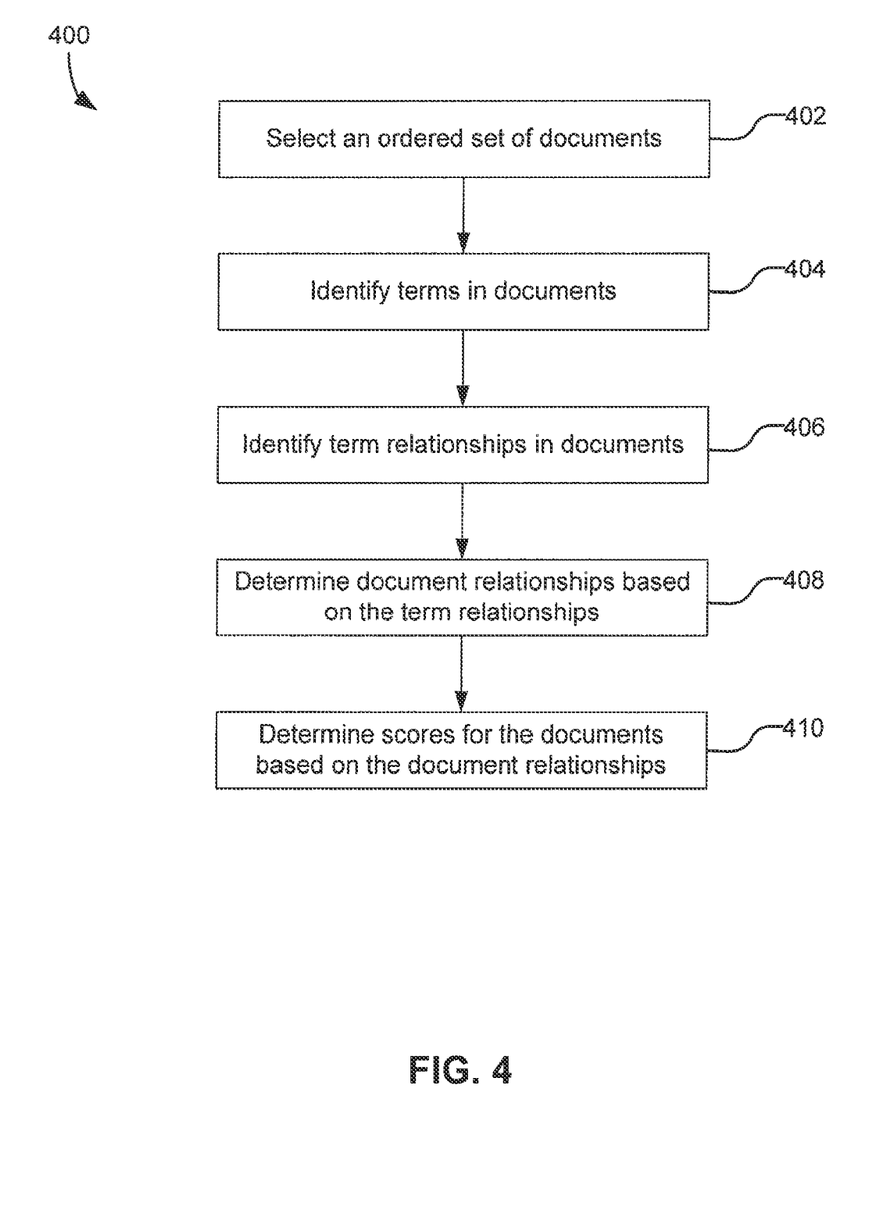
FIG. 4 is a flow diagram illustrating an example process for determining scores for documents using term relationships.

FIG. 4 is a flow diagram illustrating an example process 400 for determining scores for documents using term relationships. For convenience, the process 400 will be described in reference to a system (e.g., system 200) that performs the process.

The search engine 206 receives a set of documents, where the documents in the set are ordered in some manner (402). In some implementations, the received documents are an ordered set of documents that correspond to search results for a particular search query. For example, the search engine 206 can receive documents corresponding to search results for a query "mockingbird." These documents are each associated with a score assigned by the search engine 206 (based on, for example, relevance of the document, number of inbound and outbound hyperlinks, etc.) and ordered based on that score. In some implementations, the search engine 206 receives the documents corresponding to the top search results for the query. For example, the search engine 206 can receive documents corresponding to the top 1000 search results out of about 5 million results for the query "mockingbird."

In some other implementations, the search engine 206 receives a set of documents, where the documents are ordered in some other manner. The documents can be ordered by any suitable criterion or criteria (e.g., date of creation, date of last modification, title, author, etc.). For example, a search engine 206 within a corporate enterprise network can receive a set of documents within the corporate enterprise network (e.g., documents stored in a document repository within the corporate enterprise network). The search engine 206 orders the received documents, if the documents are not already ordered.

The search engine 206 can index the received documents. In some implementations, the search engine 206 stores the received documents in the document repository 222.

The term identification module identifies terms in the set of documents (404). The term identification module 210 parses the documents to identify terms within the received documents.

In some implementations, the term identification module 210 eliminates or disregards some terms in the documents before proceeding further. In some implementations, the term identification module 210 calculates the term frequency—inverse document frequency (TFIDF) scores of the terms in the documents, with the document set for purposes of calculating the IDF being the documents indexed and/or stored in the document repository 222. Terms whose TFIDF scores are below a specified threshold are disregarded. By disregarding terms whose TFIDF scores are below the threshold, relatively common terms (e.g., prepositions, articles, etc.) can be eliminated from consideration. The result is that each document has a set of non-eliminated terms.

For each of the documents in the set of documents, the non-eliminated terms in a document are scored with respect to the document, based on one or more criteria. In some implementations, a term in a document is scored based on a number of occurrences of the term in the document and on a position of earliest occurrence of the term in the document. In some implementations, the score can be further based on a classification of the terms, such as whether a term is a named entity, a proper noun, a topic-specific term, and so on. In some implementations, the term score is a metric of the importance of the term to the respective document.

For example, the score of a term can be calculated using the following formula:

$$\text{Term score } S = \alpha(\text{number of occurrences}) + \left(\frac{\beta}{\sqrt{\text{earliest position of occurrence of term}}}\right) \quad \text{Equation (1)}$$

In Equation 1, the term score S is a linear combination of the number of occurrences of the term in the document and the inverse of the square root of the earliest position of occurrence of the term in the document, where the position of occurrence is expressed as the sentence number in the document in which the term appeared. For example, the first sentence in the document has a sentence number 1, the second sentence has a sentence number 2, and so on. $\alpha$ and $\beta$ are constant weight values. Bonuses can be added to the term score if the term is a named entity, proper noun, or a topic-specific term (e.g., +1 to the term score for a named entity or proper noun and +3 to the term score for a topic-specific term).

In some implementations, part-of-speech and capitalization analysis can be performed on the document to identify terms that may be noun phrases, named entities or proper nouns. Other name entity identification techniques may be used, such as those disclosed in U.S. patent application Ser. No. 11/378,628, titled "Detecting Novel Document Content," filed Mar. 20, 2006. In some implementations, variants of a term (e.g., plural form of a noun, verb conjugations, word stem with a suffix added, etc.) are identified as multiple occurrences of the same term.

In some implementations, for each of the documents, a subset of the non-eliminated terms is selected. In some implementations, a non-eliminated term in a document is selected for further processing if the term score for the non-eliminated term is in the top-20 among non-eliminated terms in the document and the term score is above a threshold.

In some implementations, vectors are generated for each occurrence of a selected term in a document. The vector can have the following format: <term, sentence number in document, paragraph number, and sentence number in paragraph>. The vector includes the term itself and the position of the occurrence, where the position of the occurrence is expressed as the sentence number in the document, the paragraph of the occurrence, and the sentence number within the paragraph of occurrence. Thus, for example, a term that appears in the 3rd sentence of the 4th paragraph of the document, which is also the 37th sentence in the document, can have the following vector: <term, 37, 4, 3>.

The term relationships module 212 identifies term relationships in the documents (406). For each document in the set of documents, relationships between pairs of selected terms are identified. In some implementations, a pair of terms has a relationship if there is an interaction between the pair of terms in the respective document. A pair of terms interact with each other if they are located in close proximity (e.g., within the same paragraph, within the same sentence, or within a predetermined number of sentences from each other). In some implementations, a pair of terms has an interaction if the terms appear in the same paragraph at least once in the document. Term interactions can be identified using the positional information (e.g., paragraph and sentence) in the term vectors.

In some implementations, a local term relationship graph can be generated for each document in the set of documents. The local term relationship graph for a document has the selected terms of the document as nodes. Two term nodes have an edge, which is undirected and weighted, between them if there is at least one interaction between the terms.

In some implementations, if a node in a local term relationship graph has no edges connected to it (i.e., the corresponding term has no interaction with other terms represented in the graph), that node is removed from the graph and the corresponding term is disregarded.

In some implementations, the weight of an edge between two terms in a local term relationship graph is based on the positions of earliest occurrences of the terms in the document and the distance between the two terms in the interaction. In one implementation, the weight of an edge between terms $t_1$ and $t_2$ can be calculated using the following formula:

$$\text{edge weight } W(t_1, t_2) = \frac{(S(t_1) \times S(t_2))/(S(t_1) + S(t_2))}{\sqrt{ab}\sqrt{|(y-x)|+1}} \quad \text{Equation (2)}$$

In Equation 2, a is the earliest occurrence of term $t_1$ in the document, and b is the earliest occurrence of term $t_2$ in the document, where a and b are both expressed as sentence numbers in the document. $S(t_1)$ and $S(t_2)$ are term scores for $t_1$ and $t_2$, respectively, calculated in accordance with Equation 1. y−x is the distance between terms $t_1$ and $t_2$ in a particular interaction, expressed as the number of sentences. For example, if the two terms appear in the same sentence, then y−x=0; if one term appears in one sentence and the other term appears in the next sentence in the paragraph, then y−x=1. If the two terms have multiple interactions in the document, then the weight of the edge between the nodes corresponding to the two terms is calculated using the interaction where the terms are closest together, i.e., at which y−x is the smallest.

Figure 5A:
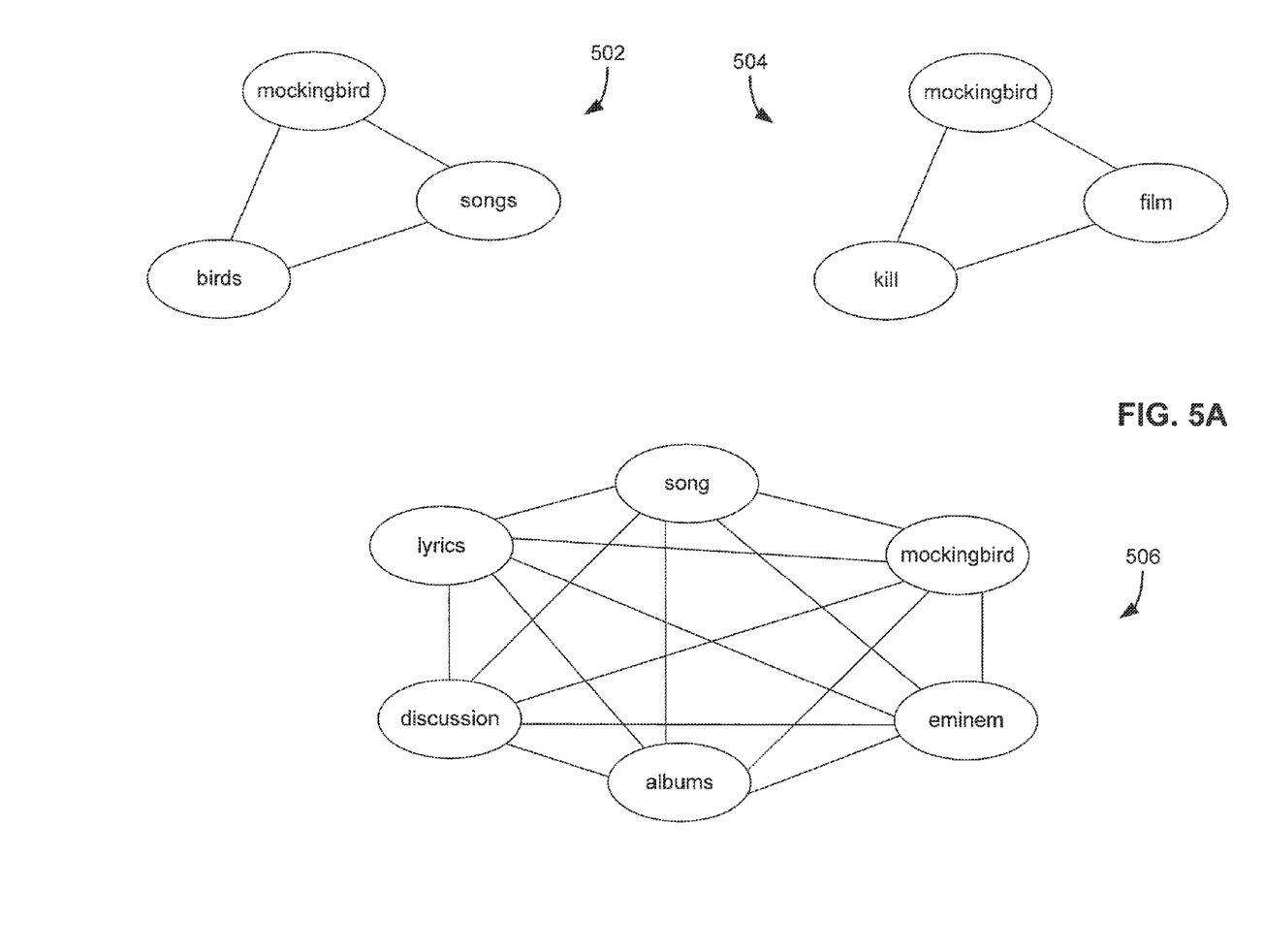
FIG. 5A illustrates example local term relationship graphs.

Example local term relationship graphs are illustrated in FIG. 5A. Edge weights have been omitted from graphs 502, 504, and 506 for convenience. Graph 502 illustrates an example local term relationship graph for a document that consists of the sentence, "The mockingbird is known for its long, complex songs that include imitations of many other birds." In graph 502, the selected terms for the document are "mockingbird," "songs," and "birds." These words have interactions with each other by virtue of being in the same sentence (and thus the same paragraph). As a result, the corresponding nodes in the graph 502 have outgoing edges to each other.

Graph 504 illustrates an example local term relationship graph for a document that consists of the sentence, "To Kill a Mockingbird is a much-loved, critically-acclaimed, classic trial film." As with graph 502, the nodes in graph 504 have outgoing edges to each other because the corresponding terms have interactions with each other.

Graph 506 illustrates an example local term relationship graph for a document that consists of the phrase, "Lyrics and discussion for the song Mockingbird by Eminem from the albums." As with graphs 502 and 504, the nodes in graph 506 has outgoing edges to each other because the corresponding terms have interactions with each other.

After the local term relationships in the set of documents are identified and weighted, a number of them are selected to represent term relationships for the set of documents as a group. In some implementations, a global term relationship graph is generated using the local term relationship graphs of the documents in the set of documents.

The global term relationship graph includes nodes that are at least some of the selected terms from the set of documents. An edge connects two nodes in the global term relationship graph if the two nodes have a connecting edge in at least one of the local term relationship graphs. The edges in the global term relationship graph carry edge state information, details of which are described below.

In some implementations, a global term relationship graph is generated by adding nodes and undirected term relationship edges from the local term relationship graphs to the global term relationship graph. Initially, the global term relationship graph is an empty graph, with no nodes and no edges. A node corresponding to a term in a local term relationship graph is added to the global term relationship graph if the node has an edge connected to another node in the local term relationship graph and a node for the same term (or variant thereof) is not already in the global term relationship graph.

In some implementations, edges between term nodes in the local term relationship graphs are added to the global term relationship graph based on their weights and on the order in which the documents in the set of documents are ordered. That is, edges from the local term relationship graph corresponding to the first document in the set are added to the global term relationship graph, then edges from the local term relationship graph corresponding to the second document are added to the global term relationship graph, then edges from the local term relationship graph corresponding to the third document, and so on. Further, an edge between two term nodes are added only if the two term nodes are not already connected by an edge in the global term relationship graph or if the edge is higher weighted than an existing edge representing the same term interaction in the global term relationship graph.

For example, say that the local term relationship graphs for the first 3 documents in the set each include an edge between the nodes for the terms "mockingbird" and "song," with the edge weight in the local graph for the first document $D_1$ in the set being 0.5, the edge weight in the local graph for the next document $D_2$ in the set being 0.4, and the edge weight in the local graph for the next document $D_3$ in the set being 0.6. The edge from the first local graph is added to the global term relationship graph because there is no existing edge in the global graph representing the same interaction. The edge from the second local graph is not added to the global graph because its weight is lower than the edge weight for the same interaction in the first local graph. The edge from the third local graph is added to the global graph and replaces the edge from the first local graph because its weight is higher than the edge weight for the same interaction in the first local graph.

In some implementations, edge state information is stored when an edge is added to the global term relationship graph or is replaced by a higher-weighed edge. The stored edge state information includes the document from which the edge came, the new edge weight, and either the previous edge weight or the difference between the new edge weight and the previous edge weight. In some implementations, the edge state information can be stored as one or more vectors (e.g., a vector in the format <document, new weight, immediately previous weight> or <document, new weight, difference between new weight and the immediately previous weight>). The edge state information vectors accumulate for an edge as the edge is added and replaced.

For example, returning to the example for the nodes "mockingbird" and "song" described above, when the edge from the first local graph is added to the global graph, a vector <$D_1$, 0.5, 0> (in the format <document, new weight, immediately previous weight>) is stored for the edge. This vector indicates that the edge came from the local graph for document $D_1$, has a current weight of 0.5, and the immediately previous weight is 0 (i.e., there was no existing edge connecting the two nodes previously). The edge from $D_2$ has a lower weight and is thus disregarded. The edge from $D_3$ has a higher weight and replaces the edge from $D_1$. The vector <$D_3$, 0.6, 0.5> is added to the edge. This vector indicates that the (now current) edge came from the local graph for document $D_3$, has a current weight of 0.6, and the immediately previous weight is 0.5. The edge state information has two vectors at this point, <$D_1$, 0.5, 0> and <$D_3$, 0.6, 0.5>. As edges from subsequent documents replace the current edge, additional vectors are added to the edge state information.

Figure 5B:
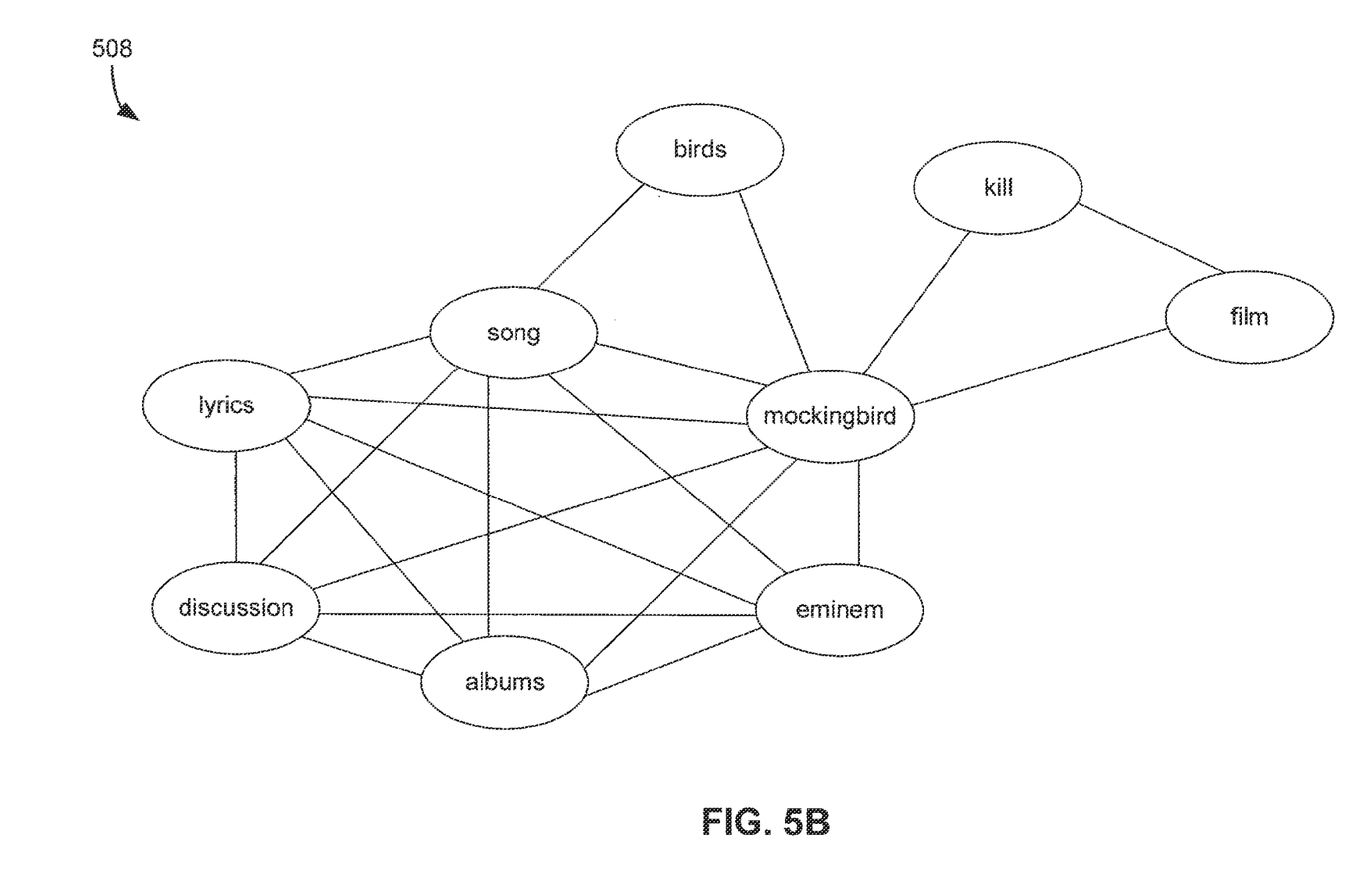
FIG. 5B illustrates an example global term relationship graph.

An example global term relationship graph is illustrated in FIG. 5B. Global term relationship graph 508 is derived from local term relationship graphs 502, 504, and 506. Edge weights and vectors have been omitted for convenience. The graph 508 includes nodes from the local term relationship graphs 502, 504, and 508. The graph 508 includes only one node for the term "mockingbird," even though graphs 502, 504, and 506 each having one node for the term "mockingbird." The graph 508 includes one node for the term "song," even though graphs 502 and 506 include a node for the same term ("song") and a variant of the term ("songs").

In some implementations, a term weight can be calculated using the global term relationship graph. The term weight for a term can be calculated as follows:

Term weight T=Σ weights of edges connected to term node        Equation (3)

In Equation 3, the weight T of a term node (and the term) is a sum of the current weights of the edges connected to the term node.

Document relationships are determined based on the term relationships (408). In some implementations, relationships between documents are determined using the global term relationships graph. The document relationships can be represented by a document relationship graph, which is a directed graph. Generation of the document relationship graph is described below.

The global term relationship graph is used to determine a term-document weight between a term and a document. Conceptually, the term-document weight represents the new information, contained in the document, that is about the semantics represented by the term. In some implementations, a term-document weight is calculated as follows:

Let $R(t_1, D_1)$ be the set of all term relationships involving term $t_1$ and document $D_1$ (i.e., edges in the local term relationship graph for $D_1$, where $t_1$ is an end node of the edge and the edge was added to the global relationship graph in accordance with the criteria described above)

$$TDW(t_1 \to D_1) = T(t_1) \times \sum_{R(t_1, D_1)} \frac{(W_{new} - W_{old})}{W_{old}} \qquad \text{Equation (4)}$$

The term-document weight TDW contributed to $D_1$ by $t_1$ (written as "$TDW(t_1 \to D_1)$" in Equation 4 above) is a product of the term weight T for term node $t_1$, calculated in accordance with Equation 3, and the sums of the rates of increase in weights when edges involving document $D_1$ and term $t_1$ were added to the global term relationships graph. If an edge is the first edge added to the global graph for a particular term interaction, the amount of increase is $(W_{new}-0)/1$. In some implementations, $TDW(t_1 \to D_1)$ is also divided by the number of edges connected to term node $t_1$.

Figure 6:
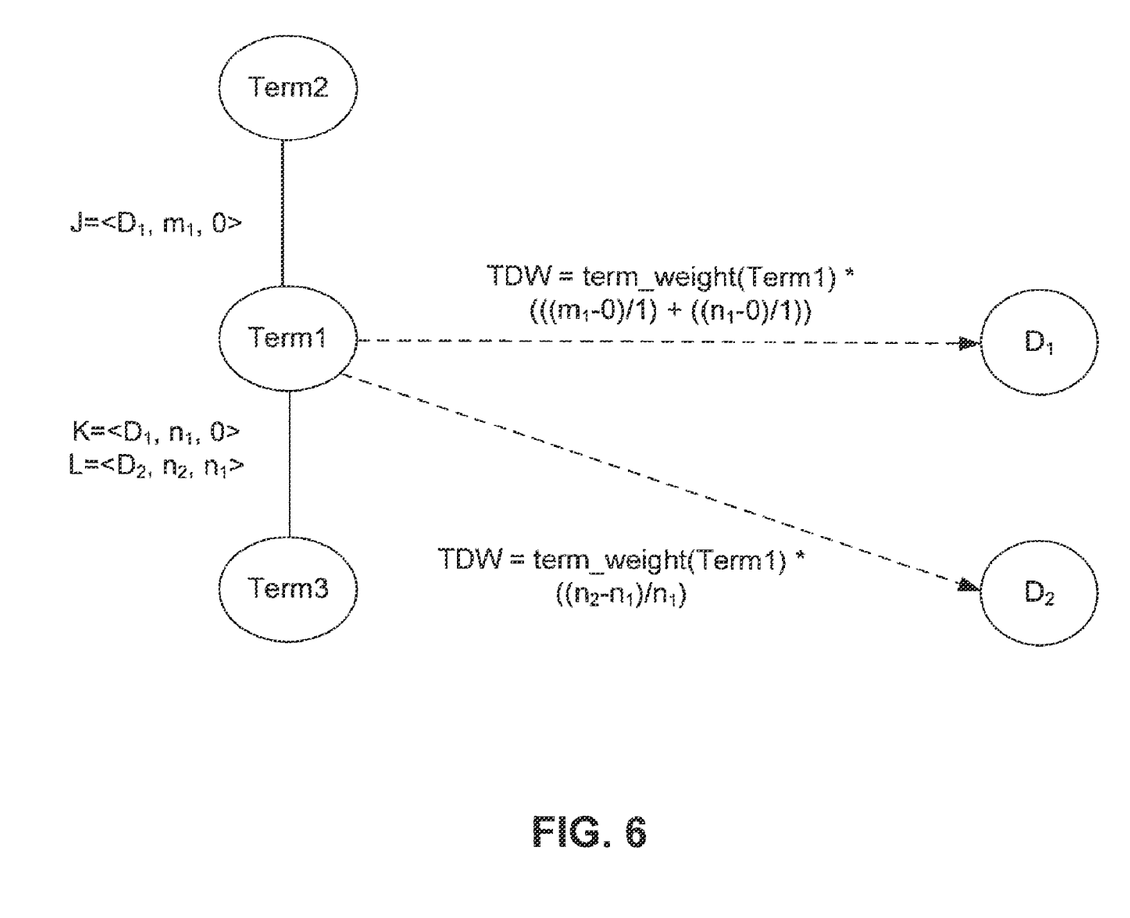
FIG. 6 illustrates example term-document weights.

An example calculation of the term-document weight for a document is illustrated in FIG. 6. FIG. 6 illustrates term nodes Term1, Term2, and Term3 in a sub-graph of a global term relationships graph and documents $D_1$ and $D_2$. Term1 has respective interactions with Term2 and Term3, represented by the edges connecting the nodes. The edge state information for edge Term1-Term2 includes a vector J, which indicates that the initial version (because the previous weight is 0) of the edge came from document $D_1$ (i.e., the local term relationship graph for $D_1$) and is weighted at $m_1$. The edge state information for edge Term1-Term3 includes vector K, which indicates that the initial version of the edge came from document $D_1$ and is weighted at $n_1$, and vector L, which indicates that the next version of the edge came from document $D_2$ (i.e., the local term relationship graph for $D_2$) and is weighted at $n_2$. The vectors K, J, and L indicate that $D_1$ and $D_2$ were a source for interactions involving Term1 that were represented in the global term relationship graph. Thus, Term1 contributes semantic value to $D_1$ and $D_2$, as indicated by the dotted lines. The weight of the total contribution to $D_1$ by Term1 can be calculated by adding the rates of increase in edge weight, which for $D_1$ is $((m_1-0)+(n_1-0))/1$ because the weight changes were from 0 (i.e., no previously existing edge), and multiplying the sum by the term weight for Term1. The weight of the contribution W to $D_2$ by Term1 can be calculated by adding the rates of increase in edge weight, which for $D_2$ is $n_2-n_1/n_1$, and multiplying the sum by the term weight for Term1.

The edges in the document relationship graph, which conceptually represent relationships between documents based on shared semantics through contribution of semantic value by terms in common, are determined. In some implementations, the edges in the document relationship graph are determined by determining pairs of documents for which the corresponding nodes have at least one semantic value-contributing term in common are determined. In other words, for a document $D_1$ with set A of terms that have term-document weights for $D_1$, and document $D_2$ with set B of terms that have term-document weights for $D_2$, the importance-contributing terms in common are the intersection of A and B. In some implementations, the determination of common terms is a comparison, between a pair of documents, of terms that have term-document weights for the respective document and determining which terms have respective term-document weights for both documents in the pair.

In some other implementations, the edges in the document relationship graph are determined by dot product operations. For a document, a vector of term-document weights is generated. A dot product of the term-document weight vectors is determined for each pair of documents in the set of documents. If the pair of documents has at least one term-document weighted term in common, the dot product is non-zero. The document pairs whose dot products are greater than a threshold are the document pairs whose nodes are to be connected by edges in the document relationship graph.

If the nodes of two documents are to be connected by an edge in the document relationship graph, a direction of the edge is determined based on a comparison of the sums of the term-document weights of the terms (amongst the terms in the global term relationship graph) in common to the respective documents. As an example, say that documents $D_1$ and $D_2$ are to be connected by an edge in a document relationship graph, and $D_1$ and $D_2$ has term-document weighted terms $T_1$, $T_2$, and $T_3$ in common. $T_1$, $T_2$, and $T_3$ have term-document weights $x_1$, $x_2$, and $x_3$, respectively, for $D_1$, and term-document weights $y_1$, $y_2$, and $y_3$, respectively, for $D_2$. The direction of the edge between D1 and D2 is determined by comparing $\Sigma x = x_1+x_2+x_3$ to $\Sigma y = y_1+y_2+y_3$. If $\Sigma x$ is greater than $\Sigma y$, then the edge between $D_1$ and $D_2$ is directed from $D_2$ toward $D_1$. If $\Sigma y$ is greater than $\Sigma x$, then the edge is directed from $D_1$ toward $D_2$. If the two sums are equal, then the edge can be directed in either direction (e.g., a direction chosen at random, or from the document that is lower in the original ordering of the set of documents to the document that is higher in the original ordering of the set of documents).

More generally, the edge direction between documents $D_m$ and $D_n$ is determined by comparing $Z(D_m)$ and $Z(D_n)$, where $Z(D_m)$ and $Z(D_n)$ are:

$$Z(D_m) = \Sigma_1 TDW(t_1 \rightarrow D_m)$$

$$Z(D_n) = \Sigma_1 TDW(t_1 \rightarrow D_n)$$

where $t_1$ is the set of terms in the global term relationship graph that documents $D_m$ and $D_n$ have in common. If $Z(D_m)$ is greater than $Z(D_n)$, then the edge between $D_m$ and $D_n$ is directed from $D_n$ toward $D_m$. If $Z(D_n)$ is greater than $Z(D_m)$, then the edge is directed from $D_m$ toward $D_n$. If $Z(D_m)=Z(D_n)$, then the edge can be directed in either direction (e.g., a direction chosen at random, or from the document that is lower in the original ordering of the set of documents to the document that is higher in the original ordering of the set of documents).

Figure 7:
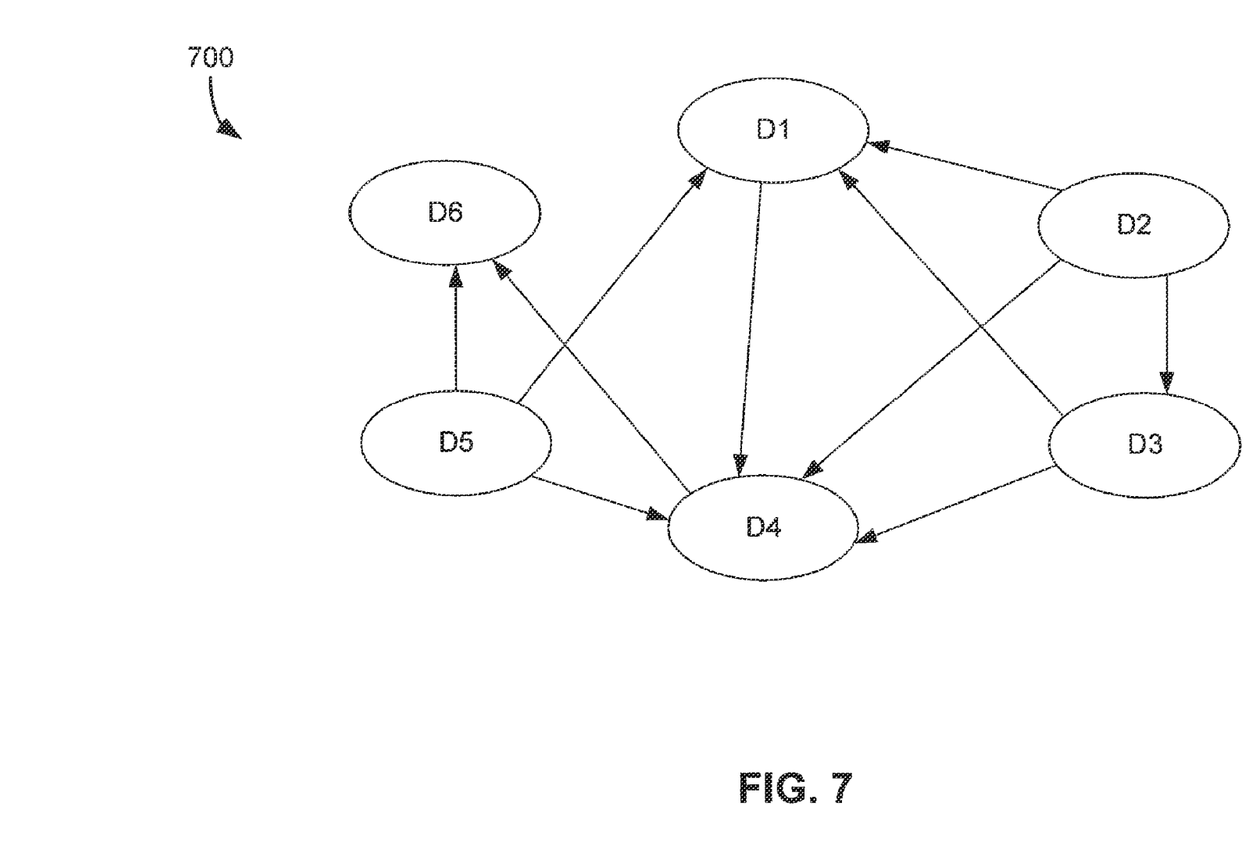
FIG. 7 illustrates an example document relationship graph.

FIG. 7 shows an example document relationship graph 700. The graph 700 shows nodes representing documents connected by directed edges.

In some implementations, the edges in a document relationship graph are all weighted the same (e.g., 1) initially. In some other implementations, the edges in a document relationship graph are weighted initially by the value of the dot products of term-document weight vectors. For example, for an edge connecting nodes corresponding to documents $D_1$ and $D_2$, the edge weight is the dot product of the term-document weight vector for $D_1$ and the term-document weight vector for $D_2$.

Scores for the documents are determined based on the document relationships (410). Scores for the documents can be determined based on a link analysis of the document relationship graph. In some implementations, the link analysis follows the PageRank algorithm disclosed in U.S. Pat. Nos. 6,285,999, 6,799,176, and 7,058,628; and in Page et al., "The PageRank Citation Ranking. Bringing Order to the Web," (January 1998), which are incorporated by reference herein in their entirety. In some other implementations, other link analysis algorithms are used.

In some implementations, the documents can be reordered based on the determined score. In some other implementations, the determined score can be combined with the original score of the document, if any. For example, the combined score is a linear combination of the original score and the score based on the document relationship graph (e.g., ½ of the original score plus ½ of the score based on the document relationship graph). The documents can be ranked and ordered based on the score from the document relationships or the combined score, depending on the particular implementation.

In some implementations, process 400 described above can be performed periodically to score previously unavailable documents and to update scores.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method performed by one or more computers, the method comprising:
   receiving a plurality of documents, the plurality of documents having an initial order;
   identifying local term relationships between terms in the plurality of documents, each local term relationship being a relationship between a pair of terms in a respective document;
   determining relationships among the documents in the plurality of documents based on the local term relationships and on the initial order of the documents, including selecting each document, in order of the initial order of the documents, and adding nodes representing terms in the selected document to a global term relationships graph and adding edges between nodes representing terms having a local term relationship in the selected document to the global term relationships graph; and
   determining a respective score for each document in the plurality of documents based on the document relationships.

2. The method of claim 1, further comprising determining a magnitude for each of the identified local term relationships.

3. The method of claim 2, wherein adding edges to the global term relationships graph includes assigning to each edge the magnitude for the local term relationship represented by the edge.

4. The method of claim 3, wherein adding nodes and edges to the global term relationships graph comprises:
   selecting a first document and adding a first edge between two nodes representing terms of the first document to the global term relationships graph, the first edge having a first magnitude based on the terms of the first document represented by the two nodes sharing the first edge;
   selecting a second document later in the initial order than the first document;
   determining that the second document includes the terms represented by the two nodes sharing the first edge;
   determining a second magnitude for the first edge based on the terms represented by the two nodes in the second document; and
   determining that the second magnitude is greater than the first magnitude and assigning the second magnitude to the first edge.

5. The method of claim 1, wherein determining relationships among the documents in the plurality of documents based on the local term relationships and on the initial order of the documents includes generating a document relationships graph based on the global term relationships graph.

6. The method of claim 5, wherein the document relationships graph includes nodes representing documents and edges between nodes representing relationships between documents.

7. The method of claim 6, wherein a first edge representing relationships between first and second documents has a direction from the first document to the second document, wherein the first document is lower in the initial order than the second document.

8. A system of one or more computers configured to perform operations comprising:
   receiving a plurality of documents, the plurality of documents having an initial order;
   identifying local term relationships between terms in the plurality of documents, each local term relationship being a relationship between a pair of terms in a respective document;
   determining relationships among the documents in the plurality of documents based on the local term relationships and on the initial order of the documents, including selecting each document, in order of the initial order of the documents, and adding nodes representing terms in the selected document to a global term relationships graph and adding edges between nodes representing terms having a local term relationship in the selected document to the global term relationships graph; and
   determining a respective score for each document in the plurality of documents based on the document relationships.

9. The system of claim 8, the operations further comprising determining a magnitude for each of the identified local term relationships.

10. The system of claim 9, wherein adding edges to the global term relationships graph includes assigning to each edge the magnitude for the local term relationship represented by the edge.

11. The system of claim 10, wherein adding nodes and edges to the global term relationships graph comprises:
- selecting a first document and adding a first edge between two nodes representing terms of the first document to the global term relationships graph, the first edge having a first magnitude based on the terms of the first document represented by the two nodes sharing the first edge;
- selecting a second document later in the initial order than the first document;
- determining that the second document includes the terms represented by the two nodes sharing the first edge;
- determining a second magnitude for the first edge based on the terms represented by the two nodes in the second document; and
- determining that the second magnitude is greater than the first magnitude and assigning the second magnitude to the first edge.

12. The system of claim 8, wherein determining relationships among the documents in the plurality of documents based on the local term relationships and on the initial order of the documents includes generating a document relationships graph based on the global term relationships graph.

13. The system of claim 12, wherein the document relationships graph includes nodes representing documents and edges between nodes representing relationships between documents.

14. The system of claim 13, wherein a first edge representing relationships between first and second documents has a direction from the first document to the second document, wherein the first document is lower in the initial order than the second document.

15. A computer program product, encoded on a computer-readable medium, operable to cause a data processing apparatus to perform operations comprising:
- receiving a plurality of documents, the plurality of documents having an initial order;
- identifying local term relationships between terms in the plurality of documents, each local term relationship being a relationship between a pair of terms in a respective document;
- determining relationships among the documents in the plurality of documents based on the local term relationships and on the initial order of the documents, including selecting each document, in order of the initial order of the documents, and adding nodes representing terms in the selected document to a global term relationships graph and adding edges between nodes representing terms having a local term relationship in the selected document to the global term relationships graph; and
- determining a respective score for each document in the plurality of documents based on the document relationships.

16. The computer program product of claim 15, the operations further comprising determining a magnitude for each of the identified local term relationships.

17. The computer program product of claim 16, wherein adding edges to the global term relationships graph includes assigning to each edge the magnitude for the local term relationship represented by the edge.

18. The computer program product of claim 17, wherein adding nodes and edges to the global term relationships graph comprises:
- selecting a first document and adding a first edge between two nodes representing terms of the first document to the global term relationships graph, the first edge having a first magnitude based on the terms of the first document represented by the two nodes sharing the first edge;
- selecting a second document later in the initial order than the first document;
- determining that the second document includes the terms represented by the two nodes sharing the first edge;
- determining a second magnitude for the first edge based on the terms represented by the two nodes in the second document; and
- determining that the second magnitude is greater than the first magnitude and assigning the second magnitude to the first edge.

19. The computer program product of claim 15, wherein determining relationships among the documents in the plurality of documents based on the local term relationships and on the initial order of the documents includes generating a document relationships graph based on the global term relationships graph.

20. The computer program product of claim 19, wherein the document relationships graph includes nodes representing documents and edges between nodes representing relationships between documents.

21. The computer program product of claim 20, wherein a first edge representing relationships between first and second documents has a direction from the first document to the second document, wherein the first document is lower in the initial order than the second document.

* * * * *